(12) United States Patent
Mancho et al.

(10) Patent No.: US 10,499,231 B2
(45) Date of Patent: Dec. 3, 2019

(54) EMERGENCY TEXTING SOFTWARE SYSTEM AND METHOD FOR NOTIFYING EMERGENCY SERVICES

(71) Applicants: Shiri Mancho, Austin, TX (US); Martha Ofey Mancho, Austin, TX (US)

(72) Inventors: Shiri Mancho, Austin, TX (US); Martha Ofey Mancho, Austin, TX (US)

(*) Notice: Subject to any disclaimer, the term of this patent is extended or adjusted under 35 U.S.C. 154(b) by 0 days.

(21) Appl. No.: 15/644,662

(22) Filed: Jul. 7, 2017

(65) Prior Publication Data

US 2018/0014173 A1 Jan. 11, 2018

Related U.S. Application Data

(60) Provisional application No. 62/359,501, filed on Jul. 7, 2016.

(51) Int. Cl.
| | |
|---|---|
| *H04W 4/90* | (2018.01) |
| *H04W 4/02* | (2018.01) |
| *H04W 4/22* | (2009.01) |
| *H04W 4/14* | (2009.01) |
| *H04L 29/08* | (2006.01) |
| *G06F 8/61* | (2018.01) |

(52) U.S. Cl.
CPC ............ *H04W 4/90* (2018.02); *H04L 67/306* (2013.01); *H04W 4/02* (2013.01); *H04W 4/14* (2013.01); *H04W 4/22* (2013.01); *G06F 8/61* (2013.01)

(58) Field of Classification Search
CPC ......... H04W 4/14; H04W 4/22; H04W 76/00; H04W 4/02; H04W 52/0296; H04W 4/90; H04M 11/04; H04L 67/306; G06F 8/61
See application file for complete search history.

(56) References Cited

U.S. PATENT DOCUMENTS

| | | | | |
|---|---|---|---|---|
| 3,553,377 | A * | 1/1971 | Jones | H04M 11/045 379/37 |
| 3,632,879 | A * | 1/1972 | Freisinger | H04M 11/045 379/40 |
| 5,710,803 | A * | 1/1998 | Kowal | H04M 11/04 379/41 |
| 9,148,894 | B1 * | 9/2015 | Pan | H04W 4/14 |
| 2007/0036395 | A1 * | 2/2007 | Okun | G07C 9/00087 382/115 |

(Continued)

*Primary Examiner* — Nizar Sivji
(74) *Attorney, Agent, or Firm* — Integrity Patent Group, PLC; Charles E. Runyan (57) ABSTRACT

An emergency texting software system and method for notifying emergency services includes providing an emergency texting software system, installing the emergency texting software system as an application, selecting an icon of at least one emergency service during an emergency service and selecting at least one pre-populated message to be communicated to the emergency service. The emergency texting software system and method for notifying emergency services is useful for contacting emergency services during times of duress where it would otherwise be difficult to send a text message, or making a calling 911, trying to explain the situation and give out address without being heard or stopped by the perpetrator. It thus facilitates a discrete call for help and quicker response rate.

16 Claims, 5 Drawing Sheets

(56) References Cited

U.S. PATENT DOCUMENTS

| | | | |
|---|---|---|---|
| 2007/0082651 A1* | 4/2007 | Loizeaux | H04M 1/72541 455/404.1 |
| 2010/0003958 A1* | 1/2010 | Ray | G10L 13/043 455/404.2 |
| 2011/0028118 A1* | 2/2011 | Thomas | H04M 1/2745 455/404.1 |
| 2011/0143704 A1* | 6/2011 | Lorentz | A61K 31/00 455/404.1 |
| 2014/0051379 A1* | 2/2014 | Ganesh | H04W 4/22 455/404.1 |
| 2014/0329491 A1 | 11/2014 | Scott | |
| 2015/0033274 A1* | 1/2015 | Magri | H04N 21/235 725/109 |
| 2016/0006812 A1* | 1/2016 | Xavier | H04W 4/008 455/404.1 |
| 2016/0057600 A1* | 2/2016 | Ung | H04W 4/14 455/404.2 |

* cited by examiner

EMERGENCY TEXTING SOFTWARE SYSTEM AND METHOD FOR NOTIFYING EMERGENCY SERVICES

CROSS-REFERENCE TO RELATED APPLICATION(S)

The present application is related to and claims priority to U.S. Provisional Patent Application No. 62/359,501 filed Jul. 7, 2016, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of software applications of existing art and more specifically relates to an emergency texting software application.

RELATED ART

A software application is a computer program designed to run on personal computers, tablet computers, mobile devices such as a smartphone, and other software devices. Software applications were originally offered for general productivity and information retrieval, including email, calendar, contacts, and stock market and weather information.

However, public demand and the availability of developer tools drove rapid expansion into other categories, such as software games, factory automation, GPS and location-based services, banking, order-tracking, ticket purchases and recently software medical applications. The explosion in number and variety of applications made discovery a challenge, which in turn led to the creation of a wide range of review, recommendation, and curation sources, including blogs, magazines, and dedicated online application-discovery services. Many new applications are desirable to provide convenient solutions to the users.

U.S. Pub. No. 2014/0329491 to Deann Elma Scott relates to a ProtectEM (Domestic Abuse and Emergency App). The described ProtectEM (Domestic Abuse and Emergency App) includes mobile application created to provide emergency (911) services to individuals in cases of domestic abuse, rape, kidnapping, sexual assaults, and any other form of un-provoked violence. The app can be downloaded from regular app stores to any mobile device, or can be embedded into wearable device/accessories like earrings, watches, necklaces, clothing, skin patches, or electronic tattoos etc., which can be easily activated in an emergency to alert emergency responders that the wearer is in danger and needs help. It would also beam the wearers' exact location so that responders can quickly get to the scene. The physical accessories can be configured to start taking pictures of the attacker and immediate surroundings, and/or to start recording audio (which could assist responders in understanding the nature of the attack). In case of missing persons, a friend, care-taker, or next-of-kin can remotely activate the accessory so as to assist in locating the individual quickly.

SUMMARY OF THE INVENTION

In view of the foregoing disadvantages inherent in the known emergency texting software application art, the present disclosure provides a novel emergency texting software system and method for notifying emergency services. The general purpose of the present disclosure, which will be described subsequently in greater detail, is to provide an efficient and effective emergency texting software system and method for notifying emergency services.

An emergency texting software system and method for notifying emergency services is disclosed herein. The emergency texting software system and method for notifying emergency services includes a method, the method comprising, providing an emergency texting software system comprising: a computing device hosting an application and in communication with at least one emergency service. Also included is a database coupled to the computing device which stores a plurality of pre-populated messages suitable to be sent to at least one of the emergency service providers.

The computing device is preferably equipped with global positioning means. When the emergency texting software is installed as an application and manipulated, the application generates a text with a user-selected, pre-populated message to be sent to at least one (selected) emergency service; more than one emergency service can be notified in alternate embodiments. The emergency texting software system and method for notifying emergency services allows a user to select an icon of one of the emergency services during an emergency occurrence to notify the emergency service providers of an emergency occurrence such that the proper emergency service (or services) is able to respond to the emergency occurrence.

According to another embodiment, an emergency texting software system and method for notifying emergency services is also disclosed herein. The emergency texting software system and method for notifying emergency services includes providing an emergency texting software system, installing the emergency texting software as an application, selecting an icon of one of the emergency services during an emergency occurrence and a selecting at least one pre-populated messages to be communicated to the at least one emergency service.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, an emergency texting software system and method for notifying emergency services, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a software application and more particularly to an emergency texting software application as used to improve the efficiency of contacting emergency services.

Generally speaking, the emergency texting software system and method for notifying emergency services is a mobile phone application that will enable users to text 911 in case of an emergency. The 911 app once touched leads to three subsections; the police, fire department, or ambulance dispatch. Each of these sections will have pre-composed text messages which once selected goes to the 911 dispatch center who then sends the selected service to the client. These subsections will have pre-composed text messages that will not need to be typed, but can be selected to send. Examples of use for pre-composed texts directed for the police include; home invasion, domestic violence, street attack, abduction, and more. The ambulance service will have texts that include experiencing a stroke, experiencing a heart attack, in labor, accident, and more. The fire department application may have a text that says 'fire in my home'. This allows the user, who needs to get help discretely without alerting the perpetrator to quickly select a message to be sent to the correct department so that assistance may be efficiently dispatched. The application will also allow emergency services to trace the phone location where the texts are being sent from if the user is away from home. After downloading and installing the app, the user will need to pre-enter their name, phone number, address and other personal information upon setup.

Referring now more specifically to the drawings by numerals of reference, there is shown in FIGS. 1-4, various views of an emergency texting software system and method for notifying emergency services 100.

Figure 1:
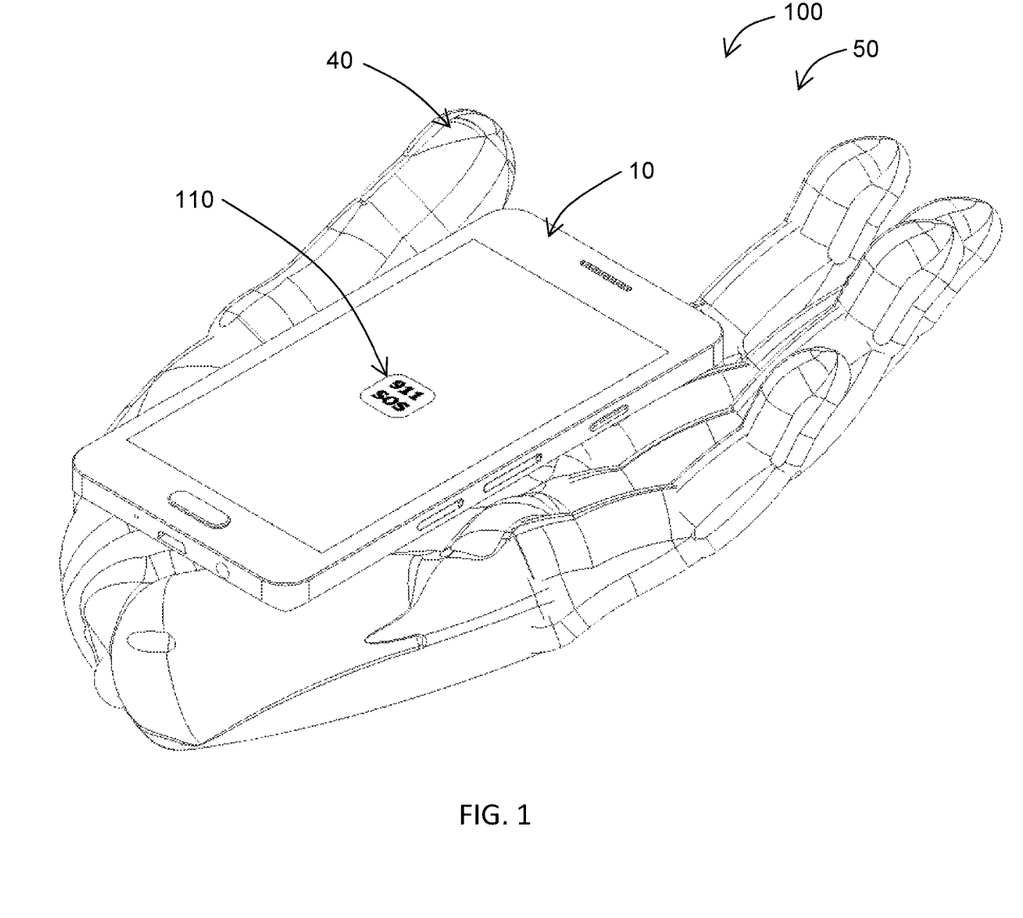
FIG. 1 is a detailed view of the emergency texting software system and method for notifying emergency services during an 'in-use' condition, according to an embodiment of the disclosure.

FIG. 1 shows an emergency texting software system and method for notifying emergency services 100 during an 'in-use' condition 150, according to an embodiment of the present disclosure. Here, the emergency texting software system and method for notifying emergency services 100 may be beneficial for use by a user 40 to notify an emergency service of an emergency occurrence via text message. As illustrated, the emergency texting software system and method for notifying emergency services 100 may include a computing device 10 hosting an application 110 and in communication with at least one emergency service 15. The emergency texting software system and method for notifying emergency services 100 may further include a database 120 coupled to the computing device 10 which stores a plurality of pre-populated messages 130 suitable to be sent to at least one emergency service 15. Furthermore, the computing device 10 may be equipped with global positioning systems 140.

According to one embodiment, the emergency texting software system and method for notifying emergency services 100 may be arranged as a kit 105. In particular, the emergency texting software system and method for notifying emergency services 100 may further include a set of instructions 107. The instructions 107 may detail functional relationships in relation to the structure of the emergency texting software system and method for notifying emergency services 100 such that the emergency texting software system and method for notifying emergency services 100 can be used, maintained, or the like, in a preferred manner.

Figure 2:
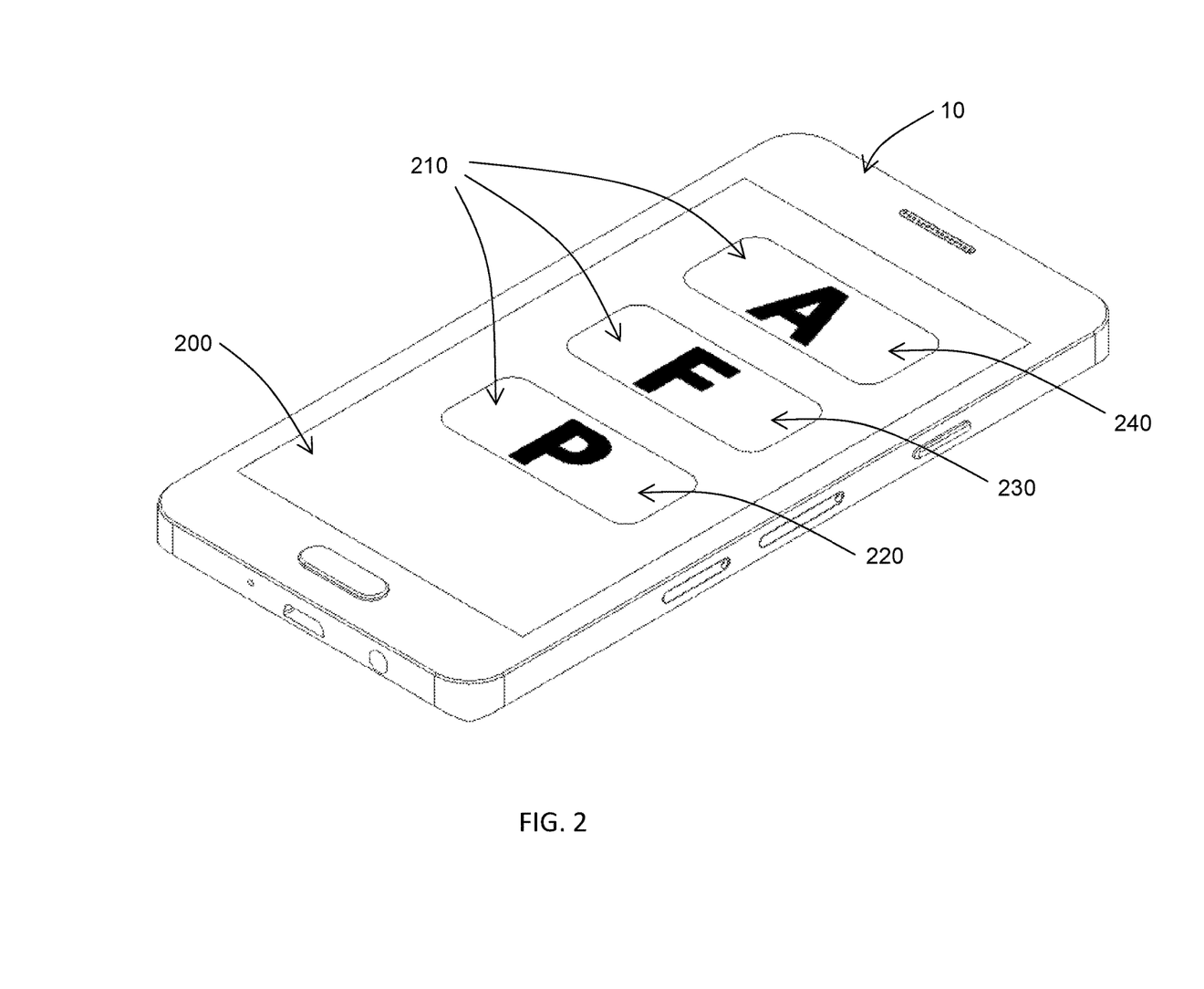
FIG. 2 is a detailed view of the emergency texting software system and method for notifying emergency services of FIG. 1, according to an embodiment of the present disclosure.

FIG. 2 shows the emergency texting software system and method for notifying emergency services 100 of FIG. 1, according to an embodiment of the present disclosure. As above, the emergency texting software system and method for notifying emergency services 100 may include a display screen 200. A display screen 200 may include the displaying devices of personal computers, tablet computers, mobile devices such as a smartphone and any other software supporting devices. The display screen is useful for displaying icons 210. Icons 210 may include exactly three icons, a police-icon 220, a fire-icon 230 and an ambulance-icon 240 wherein selection of an icon 210 generates a text with the user-selected emergency service 15.

Figure 3:
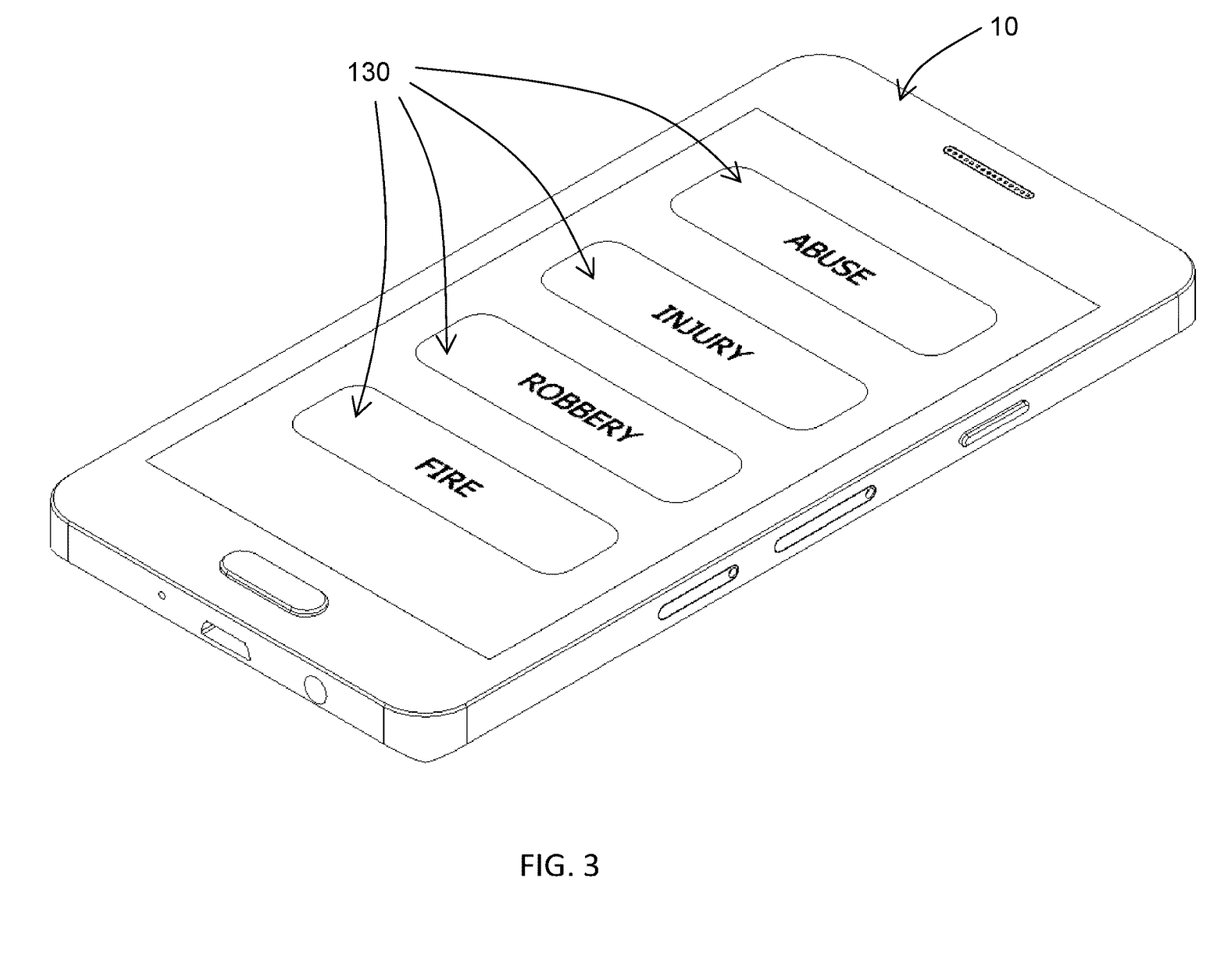
FIG. 3 is a detailed view of the emergency texting software system and method for notifying emergency services of FIG. 1, according to an embodiment of the present disclosure.

FIG. 3 is a detailed view of the emergency texting software system and method for notifying emergency services 100 of FIG. 1, according to an embodiment of the present disclosure. As above, the emergency texting software system and method for notifying emergency services 100 may include a computing device 10 hosting an application 110 and in communication with at least one emergency service 15. The emergency texting software system and method for notifying emergency services 110 may further include a database 120 coupled to the computing device 10 which stores a plurality of pre-populated messages 130 suitable to be sent to at least one emergency service 15. According to an embodiment of the present invention, after an icon 210 is selected, a variety of pre-populated messages 130 are displayed to a user on the display screen 200. Pre-populated messages 130 may include options for a variety of emergency occurrences which may be handled by the various emergency services 15 available through the emergency texting software system and method for notifying emergency services 100.

Figure 4:
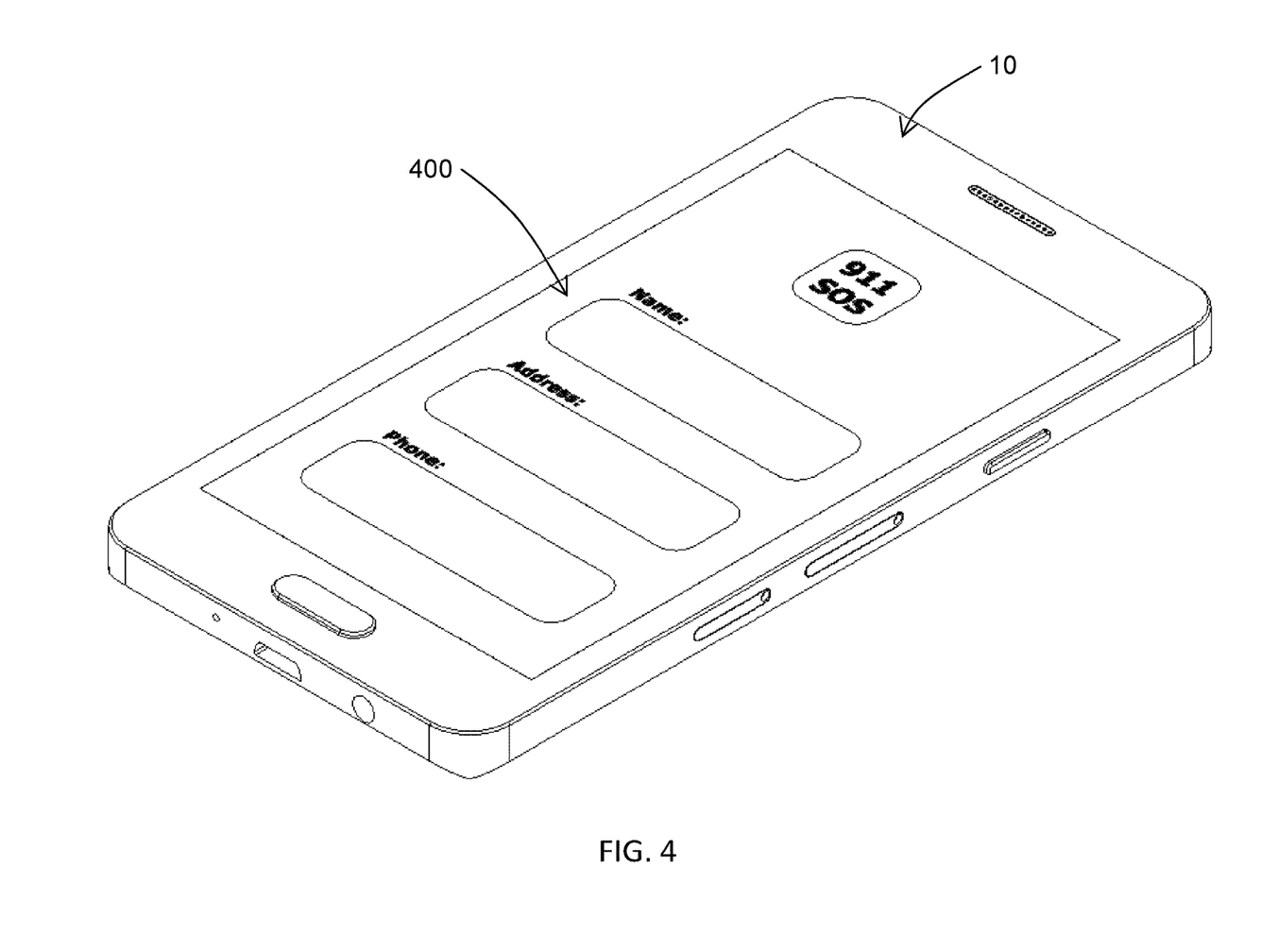
FIG. 4 is a detailed view of the emergency texting software system and method for notifying emergency services of FIG. 1, according to an embodiment of the present disclosure.

FIG. 4 is a detailed view of the emergency texting software system and method for notifying emergency services 100 of FIG. 1, according to an embodiment of the present disclosure. As detailed above, the emergency texting software application may further include a system for generating a user-profile 400 through user-input. The user-profile may be stored in the database 120 coupled to the computing device 10. The user-profile 400 may be useful for storing personal information about a user 40 such as address, medical information or special needs information about a user 40.

Figure 5:
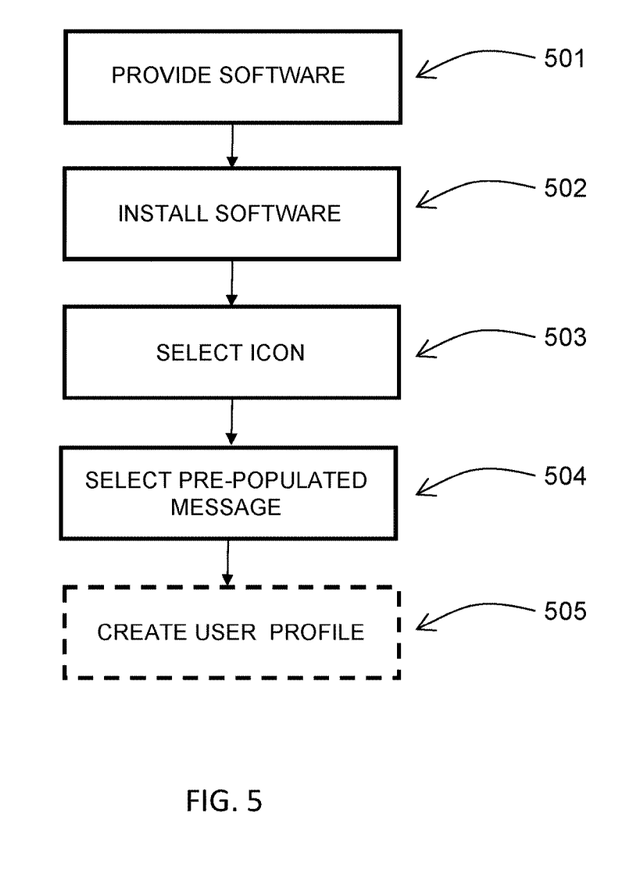
FIG. 5 is a flow diagram illustrating a method of use for the emergency texting software system and method for notifying emergency services, according to an embodiment of the present disclosure.

FIG. 5 is a flow diagram 550 illustrating a method of use 500 of emergency texting software system and method for notifying emergency services 100, according to an embodiment of the present disclosure. In particular, the method of use 500 of emergency texting software system and method for notifying emergency services 100 may include one or more components or features of the emergency texting software system and method for notifying emergency services 100 as described above. As illustrated, the method of use 500 of emergency texting software system and method for notifying emergency services 100 may include the steps of: step one 501, providing an emergency texting software system; step two 502, installing the emergency texting software as an application 110; step three 503, selecting an icon 210 of at least one emergency service 15 during an emergency occurrence; step four 504, selecting at least one pre-populated message 300 to be communicated to at least one emergency service 15; and step five 505, setting up a user-profile 400 to include user-specific data such as address and medical information to be stored in the database 120.

It should be noted that step 505 is an optional step and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for emergency texting software system and method for notifying emergency services 100, are taught herein. Tangible results are realized by printoffs of medical or other emergency reports and the screen face changes as the icon is pressed.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An emergency texting software system and method for notifying emergency services, the emergency texting software system and method for notifying emergency services comprising:
   providing an emergency texting software system, comprising:
      a computing device hosting an application and in communication with at least one emergency service;
      a database coupled to said computing device and storing therein a plurality of pre-populated messages suitable to be sent to said at least one emergency service, said computing device equipped with global positioning means; and
   wherein said emergency texting software system when manipulated generates a text with a user-selected said pre-populated messages to be sent to said at least one emergency service;
   installing said emergency texting software as an application; and
   selecting an icon of one of said at least one emergency service during an emergency occurrence to notify said one of said at least one emergency service of said emergency occurrence such that said one of said at least one emergency service is able to respond to said emergency occurrence; and
   selecting said icon includes selecting a choice between a police-icon, a fire-icon and an ambulance-icon;
   selection of said police-icon, said fire-icon and said ambulance-icon creates said text with said user-selected said pre-populated messages to be sent to appropriate said at least one emergency service;
   wherein said user-selected said pre-populated message is editable by a user;
   wherein said user-selected said pre-populated message is delivered to a national emergency contact line;
   wherein said computing device comprises a display screen, on which said icons are displayed to said user.

2. The emergency texting software system and method for notifying emergency services of claim 1, wherein said step of selecting said icon includes selecting a choice between a police-icon, a fire-icon and an ambulance-icon.

3. The emergency texting software system and method for notifying emergency services of claim 2, wherein said selection of said police-icon, said fire-icon and said ambulance-icon creates said text with said user-selected said pre-populated messages to be sent to appropriate said at least one emergency service.

4. The emergency texting software system and method for notifying emergency services of claim 1, wherein said emergency occurrence comprises a criminal emergency.

5. The emergency texting software system and method for notifying emergency services of claim 4, wherein said criminal emergency comprises a home invasion.

6. The emergency texting software system and method for notifying emergency services of claim 4, wherein said criminal emergency comprises domestic violence.

7. The emergency texting software system and method for notifying emergency services of claim 3, wherein said emergency occurrence comprises a medical emergency.

8. The emergency texting software system and method for notifying emergency services of claim 3, wherein said emergency occurrence comprises a fire emergency.

9. The emergency texting software system and method for notifying emergency services of claim 8, wherein a fire department is notified of said fire emergency via said user-selected said pre-populated message comprising FIRE IN MY HOME as said text.

10. The emergency texting software system and method for notifying emergency services of claim 4, wherein a police department is notified of said criminal emergency via said user-selected said pre-populated message comprising INVADER IN MY HOME as said text.

11. The emergency texting software system and method for notifying emergency services of claim 7, wherein a paramedic department is notified of said medical emergency via said user-selected said pre-populated message comprising TRAUMATIC INJURY as said text.

12. The emergency texting software system and method for notifying emergency services of claim 1, wherein said national emergency contact line comprises 911.

13. An emergency texting software system and method for notifying emergency services, the emergency texting software system and method for notifying emergency services comprising:

providing an emergency texting software system, comprising:
- a computing device hosting an application and in communication with at least one emergency service;
- a database coupled to said computing device and storing therein a plurality of pre-populated messages suitable to be sent to said at least one emergency service, said computing device equipped with global positioning means; and
- wherein said emergency texting software system when manipulated generates a text with a user-selected said pre-populated messages to be sent to said at least one emergency service;

installing said emergency texting software as an application; and selecting an icon of one of said at least one emergency service during an emergency occurrence to notify said one of said at least one emergency service of said emergency occurrence such that said one of said at least one emergency service is able to respond to said emergency occurrence; and selecting said icon includes selecting a choice between a police-icon, a fire-icon and an ambulance-icon;

selection of said police-icon, said fire-icon and said ambulance-icon creates said text with said user-selected said pre-populated messages to be sent to appropriate said at least one emergency service;

wherein said user-selected said pre-populated message is editable by a user;

wherein said user-selected said pre-populated message is delivered to a national emergency contact line;

wherein said computing device comprises a display screen, on which said icons are displayed to said user; and wherein number of said icons comprises exactly three said icons.

14. A method for notifying emergency services using the emergency texting software system and method for notifying emergency services of claim 13, the method comprising the steps of:

providing said emergency texting software system comprising:
- a computing device hosting an application and in communication with at least one emergency service;
- a database coupled to said computing device and storing therein a plurality of pre-populated messages suitable to be sent to said at least one emergency service, said computing device equipped with global positioning means; and
- wherein said emergency texting software system when manipulated generates a text with a user-selected said pre-populated messages to be sent to said at least one emergency service;

installing said emergency texting software as an application; and selecting an icon of one of said at least one emergency service during an emergency occurrence to notify said one of said at least one emergency service of said emergency occurrence such that said one of said at least one emergency service is able to respond to said emergency occurrence.

15. The method of claim 14, further comprising the steps of:

selecting at least one of said icons thereby inducing said pre-populated message(s) to be communicated to said at least one emergency service.

16. The method of claim 15, further comprising the steps of:

setting up a user-profile to include user-specific data including address and medical information to be stored in said database coupled to said computing device and storing therein a plurality of said pre-populated messages suitable to be sent to said at least one emergency service.

* * * * *